UNITED STATES PATENT OFFICE.

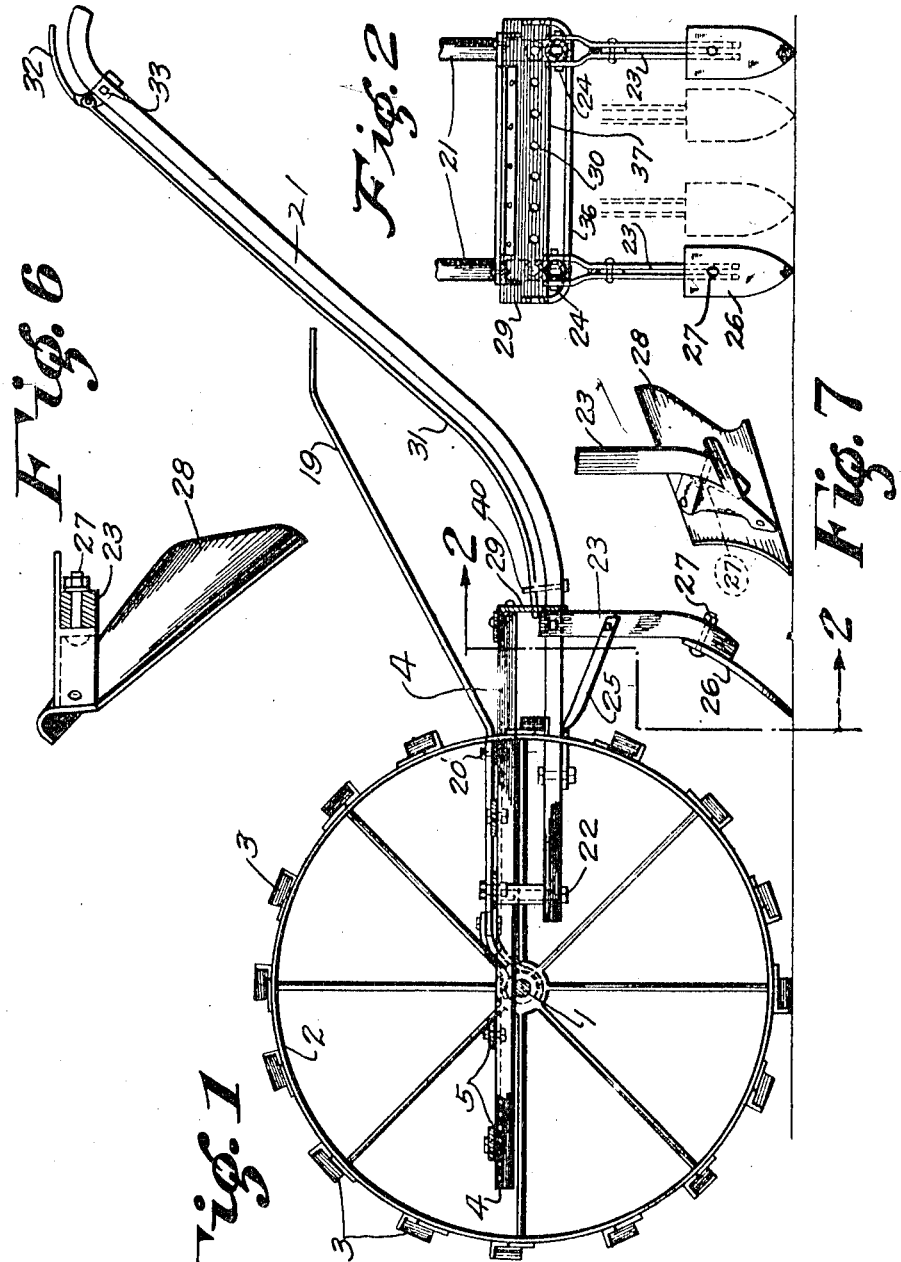

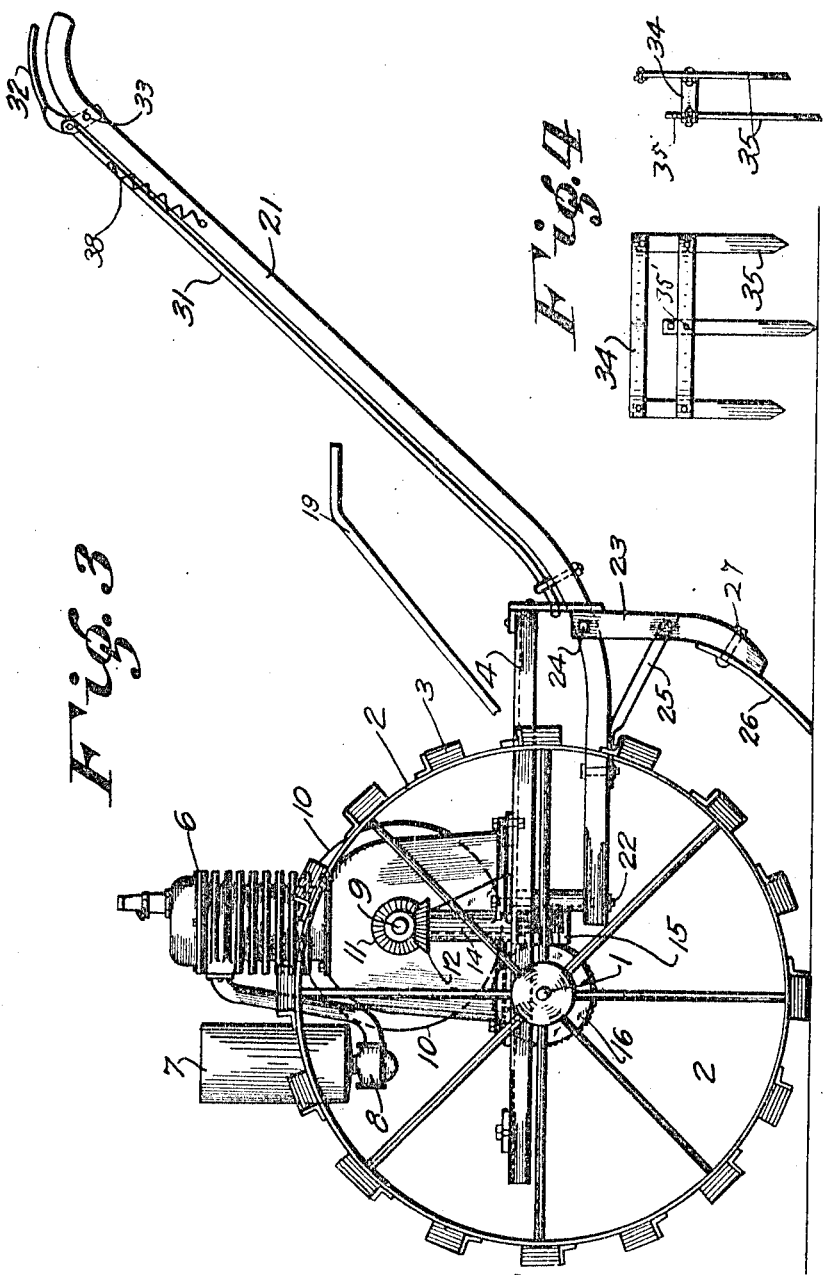

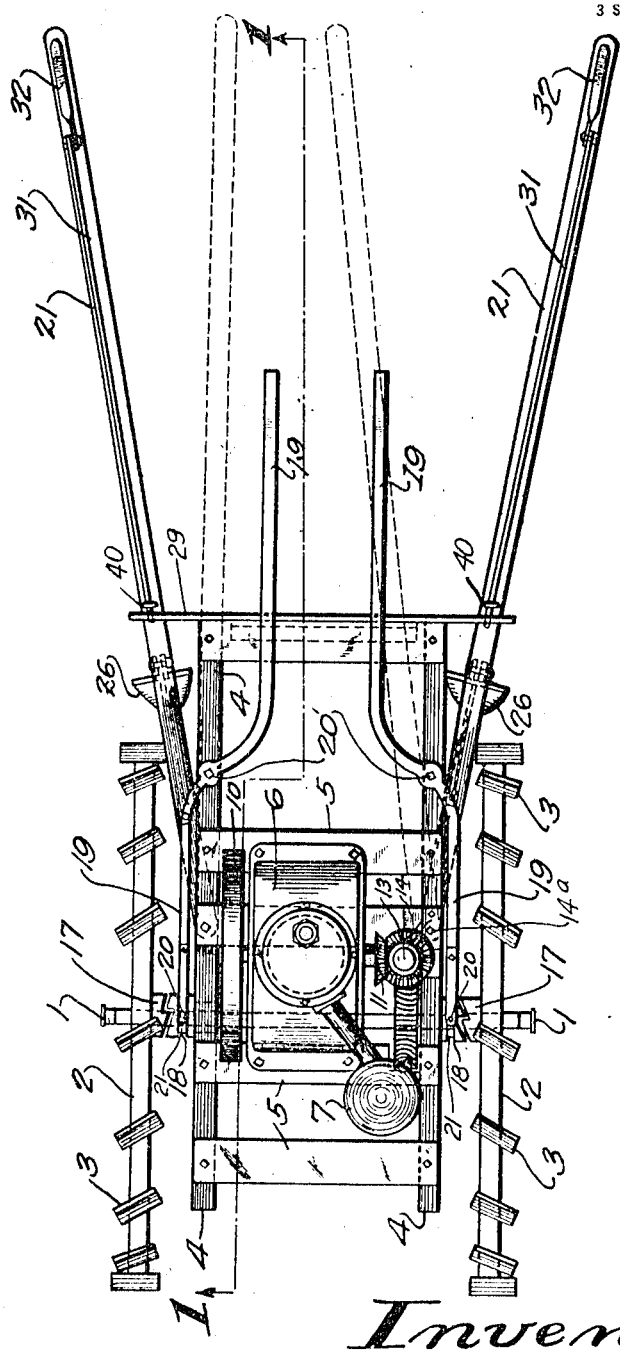

GEORGE W. JENKINS, OF ST. LOUIS, MISSOURI.

AGRICULTURAL IMPLEMENT.

1,273,496.  Specification of Letters Patent.  Patented July 23, 1918.

Application filed February 25, 1918. Serial No. 218,942.

*To all whom it may concern:*

Be it known that I, GEORGE W. JENKINS, a citizen of the United States, residing at St. Louis, in the State of Missouri, have invented certain new and useful Improvements in Agricultural Implements, of which the following is a specification containing a full, clear, and exact description, reference being had to the accompanying drawings, forming a part hereof.

My invention relates to an improved tractor agricultural implement, and consists in the novel construction and arrangement of parts hereinafter fully described and as particularly pointed out in the claim found at the end of this specification.

The object of my invention is to provide a light cultivator or similar agricultural implement with motor-mechanism and other improvements of value in the operation and control of the machine, whereby the latter will be driven and turned at will by the power exerted by the motor which is carried by the implement, thereby doing away with any necessity for hand power or animal power in forcing the shovels or other attachments through the soil.

In the drawings,

Figure 1 is a sectional side-elevation of parts of my invention, the section being taken on the line 1—1 of Fig. 5, the motor and its fly-wheel being removed to exhibit the parts beyond them.

Fig. 2 is a detail sectional elevation of parts of the machine, looking toward the rear, in the direction indicated by the arrows in Fig. 1, and the section being taken on the line 2—2 of the last-mentioned figure of the drawing.

Fig. 3 is a side elevation of my invention, ready for operation as a motor cultivator.

Fig. 4 is a front-elevation and an edge-view, respectively, of a rake-frame, which may replace the shovels shown in Fig. 3.

Fig. 5 is a top plan view of the machine.

Fig. 6 is a detail sectional plan of a plow attachment, showing the present means for connecting a mold-board to one of the shovel-beams, and Fig. 7 is a side elevation of the plow attachment and the lower end of the beam which carries it.

In carrying out my invention, in the form here shown, I have provided a suitable axle 1 on which are loosely mounted two traction-wheels 2 having suitable common grips 3 on their treads, to prevent slipping of the wheels during operation of the implement.

On the said axle 1 is mounted a horizontal frame or platform composed of parallel side bars 4 connected by cross-bars 5.

Mounted on said cross-bars 5 is a suitable motor or engine 6, at a point slightly in rear of the said axle, said motor being preferably (as shown) of the combustion type driven by gasolene or other hydrocarbon fuel, and provided with the usual gasolene tank 7, carbureter 8, crank-shaft 9, and fly-wheel 10.

Said fly-wheel is shown on one end of the said crank-shaft, exterior of the engine crank-case in the present motor, and the opposite projecting end of the said crank-shaft carries a bevel-pinion 11 which meshes with a similar bevel-pinion 12 fixed on the upper end of a short vertical worm-shaft 13 mounted in a bearing-casting or casing 14, which is provided with an integral attaching-flange secured to the frame by means of bolts or screws.

A worm 15 is fixed to the lower end of said worm-shaft 13, to engage the teeth of a worm-wheel 16 fixed upon the said axle 1.

Each of the said traction-wheels 2 is fitted with a clutch-member 17 of common construction, the teeth of which are adapted to be engaged by the teeth of a sliding clutch-member 18 which is splined as usual to rotate with said axle but to slide thereon toward and from the clutch-member carried by the traction-wheels.

Each sliding clutch-member 18 is provided with a clutch-lever 19, having a forked front end with common pins 20 engaging the walls of a peripheral slot 21 in said sliding clutch-members.

There being thus provided a separate clutch for each traction-wheel corners may be easily turned with the machine in the garden or field, by applying the power of the motor to the outside wheel, so that it alone will do the driving, while the inner traction wheel will be left free to turn upon the axle 1, as well as free of the motor.

Said clutch levers 19 are pivoted at 20' to the adjacent side-bars 4 of the said frame, and in rear of their pivotal-point the said levers are bent upwardly whence they extend rearwardly to a point convenient for the driver, in the "walking" form of my invention, in which the driver follows the implement on foot and guides same by grasping the handle 21 the forward ends of which latter are pivoted at 22 to brackets depending from the underside of said frame.

The numeral 23 designates the plow-beams, which are attached at their upper end to the said handles 21 by means of bolts 24, and are provided with braces 25 secured to said parts by common bolts, as shown.

Shovels 26 are adjustably secured to the said plow-beams by means of bolts 27; or a wider shovel or mold-board 28 may displace the shovels when desired. (See Figs. 6 and 7).

In other cases, rake-frames 34 having a series of rake-teeth 35 may displace the said shovels, by passing the bolts 27 through apertures 35' formed in the said rake-frames. (See Fig. 4).

In still other cases, the shovels 26 may be displaced by common seeders, so that seed may be planted by the machine.

The numeral 29 designates a guide-frame for the said handles 21, and it consists of a plate of metal or other material attached to the rear end of the machine frame by means of suitable bolts or screws, and provided with a horizontal series of holes 30 which are to be engaged by the lower end of a locking-rod 31, which is curved to pass upwardly and rearwardly above its handle 21 to a point near the rear end of the latter, where the said locking-rod is pivotally connected to a common bell-crank grip 32 pivoted at 33 to the handle, so as to be convenient for the driver in "setting" the handles carrying the shovels, plows, rake-frames or seeders, to work a narrow or a wider row of plants, the said locking-rod being withdrawn from the hole it is located in and placed in another and different hole in the said guide-frame, whenever it is desired to alter the distance between the said handles and the implements carried by them during operation of the machine.

A guide-rod 36 passes beneath the handles 21 and has its ends fixed to the ends of the said guide-frame, so that a space or slot 37 is formed at the lower edge of said guide-frame, to receive the said handles 21 and permit their ready movement laterally with respect to each other, while preventing their downward movement without carrying the frame of the machine with them.

A perforated ear or staple 40 is affixed to the top of each handle 21 adjacent the lower ends of the said locking-rod 31, and the lower end of said rods passes through the said perforated ear and is thereby guided in its movements and firmly held in place upon its handle.

A suitable spring 38 holds the said locking-rods normally in engagement with the wall of one hole in said guide-frame.

The operation of my invention will be clear from the above description.

I claim:

In an agricultural implement, the combination of an axle, wheels mounted on said axle, a main frame supported by said wheels and adapted to carry suitable wheel-driving means, two handles pivoted at their forward ends to said main frame, a handle-guiding frame having a horizontal slot in which said handles may move laterally, and also having a horizontal series of holes, handle locking-rods extending rearwardly from said guiding frame to a point convenient for the grasp of the operator, and mounted to slide lengthwise upon said handles so that their front ends may be inserted in and withdrawn from said holes in said guide frame, to lock said handles in any desired lateral adjustment, and suitable soil-working devices carried by the said handles.

In testimony whereof, I have signed my name to this specification in presence of two subscribing witnesses.

GEORGE W. JENKINS.

Witnesses:
FRANCES HOOVER ROSENBAUM,
JOHN C. HIGDON.

Copies of this patent may be obtained for five cents each, by addressing the "Commissioner of Patents, Washington, D. C."